United States Patent [19]

Brinkmeyer et al.

[11] Patent Number: 4,958,896
[45] Date of Patent: Sep. 25, 1990

[54] OPTICAL MULTI-GATE ELEMENT WITH AN ACOUSTO-OPTICAL MODULATOR

[75] Inventors: Ernst Brinkmeyer, Buchholz; Manfred Fuchs, Hamburg; Wolfgang Brennecke, Hamburg; Wilhelm Dargatz, Hamburg, all of Fed. Rep. of Germany

[73] Assignee: U.S. Philips Corp., New York, N.Y.

[21] Appl. No.: 267,158

[22] Filed: Nov. 4, 1988

[30] Foreign Application Priority Data

Nov. 6, 1987 [DE] Fed. Rep. of Germany ....... 3737634

[51] Int. Cl.⁵ .............................................. G02B 6/10
[52] U.S. Cl. ............................... 350/96.13; 350/96.12
[58] Field of Search .............. 350/96.13, 96.10, 96.12, 350/96.14

[56] References Cited

U.S. PATENT DOCUMENTS

| 4,575,179 | 3/1986 | Lee et al. ............................ 350/96.13 |
| 4,793,675 | 12/1988 | Handa ................................. 350/96.13 |
| 4,799,750 | 1/1989 | Miyawaki ........................... 350/96.13 |
| 4,830,448 | 5/1989 | Okazaki et al. .................... 350/96.13 |

FOREIGN PATENT DOCUMENTS

| 57-112722 | 7/1982 | Japan ................................. 350/96.13 |
| 63-29722 | 2/1988 | Japan ................................. 350/96.13 |

Primary Examiner—Frank Gonzalez
Assistant Examiner—Phan T. Heartney

[57] ABSTRACT

An optical multi-port element with an acousto-optical modulator (AOM) has at least two monomode optical waveguide connections, at one side thereof. The end surfaces of the waveguides disposed in the focal plane of a lens situated between the optical waveguides and the acousto-optical modulator. In order to obtain a construction which can be adjusted in a simple manner and which has low attenuation, with a small overall length, it is provided that at least one side of the AOM (1) a single lens (2,3,31) is disposed with its optical axis aligned to the transmission axis of the AOM (1), and that the optical wave-guides (4 to 6, 18 to 20 or 27,28) are disposed with their axes parallel to one another and spaced from the optical axis of the lens (2,3,31) in such a manner that parallel beams (14 to 17), leading from the lens (2,3,31) to the AOM (1), are directed to the active region of the AOM (1) at the Bragg angle to the optical axis.

26 Claims, 1 Drawing Sheet

OPTICAL MULTI-GATE ELEMENT WITH AN ACOUSTO-OPTICAL MODULATOR

BACKGROUND OF THE INVENTION

The invention relates to an optical multi-gate element with an acousto-optical modulator (AOM), which exhibits at one side at least two optical waveguide connections, in particular monomode optical waveguides. The end surfaces of the waveguides are disposed in the focal plane of a lens situated between the optical waveguides and the acousto-optical modulator.

Such an arrangement is known from "Journal of Lightwave Technology", Vol. Lt-2, No. 2, pages 108 to 115. In this case, a gradient lens is coaxially associated with each individual optical waveguide forming a port connection. A transformation of the field widths of the Gaussian beams is caused by the lenses. In consequence of this, the field width of the beams on the path is increased by the AOM as compared with the field width in the optical waveguides.

In the case when the AOM is not excited acoustically, the rays are not diffracted and further transmitted on a direct path. In the case of acoustic excitation, beams impinging at the Bragg angle to the acoustic wavefront are deflected by twice the Bragg angle. On account of this effect, an optical switch can be constructed with an AOM, as in the known case. Since the frequency of the deflected beam is also additionally increased or reduced by the acoustic frequency, an AOM multi-port element is also suitable for the formation of a local oscillator beam (LO) for optical heterodyne reception. The combined use of an AOM as switch and for the formation of an LO beam is known from the DE-OS No. 3,506,884 in an application for a heterodyne OTDR.

An OTDR (Optical time domain reflectometer) is a device with which the attenuation behaviour of an optical waveguide can be measured from one end, whereby the components of an optical transmission signal (laser pulse) which are backscattered by the longitudinal positions of the optical waveguide are evaluated. In order to achieve an OTDR with a large range, its optical components should have little attenuation, so that the intensity of the back-scattered signals, which decreases with increasing distance from the OTDR, is still sufficiently large to ensure an adequate signal-to-noise ratio.

A multi-port element of the initially mentioned type consists of numerous individual elements, which necessarily result in further losses. Besides the unavoidable material-dependent transmission attenuations, there are insertion attenuations, which are dependent upon the quality and geometric accuracy of the coupling-in of the optical beams. Thus, a careful relative adjustment of the individual components is essential for a low-attenuation multi-port element of the initially mentioned type. Furthermore, long free beam paths through air should be avoided, since, on the one hand, a small overall length of the multi-port element is, of course, to be aimed at, and since, on the other hand, irradiation losses, in particular due to beam broadening, unavoidably arise on the free beam paths.

Without particular measures, the direct beam and the beam deflected in the case of acoustic excitation can be detected separately only at a relatively large distance from the AOM by the lenses which cannot be constructed arbitrarily small, because the Bragg angle is very small. In order to avoid an excessively large distance, a deflecting prism is provided, in the known case mentioned initially which prism, however, causes additional attenuation losses and requires a high degree of expenditure on adjustment.

SUMMARY OF THE INVENTION

The object of the invention is to design an arrangement with a small overall length, in such a manner that it can be adjusted in a simple manner and causes little attenuation of the optical beams passed through.

This object is achieved by disposing a single lens at one side of the AOM with its optical axis parallel to the transmission axis of the AOM. The optical waveguides are disposed with their axes parallel to one another and spaced from the optical axis of the lens, in such a manner that parallel beams, leading from the lens to the AOM, are directed to the active region of the AOM at the Bragg angle to the optical axis.

While in the known case a lens is provided for each one of the optical waveguides disposed at one side of the AOM, a single lens is now sufficient at each of both sides of the AOM. The optical waveguides, the lens and the AOM are disposed relative to one another in such a manner that the lenses serve not only for the broadening and parallel concentration of the beams, but also act in addition as a deflecting element, which deflects the beam by the Bragg angle in relation to the directions of the central axes of the beams emerging from the optical waveguides.

In the case of the multi-port element designed according to the invention, the optical axes of the lens and the transmission axis of the AOM are therefore identical, and a difference in angle does not need to be set. The optical waveguides are disposed parallel to one another. A parallel position with a predetermined distance is significantly simpler to achieve than a precise angular arrangement of the optical waveguides. The closely adjacent parallel position is obtained without a deflecting prism.

The distance of the optical waveguides parallel to one another can be very small, namely smaller than three times their external diameter, so that the lenses and the end surfaces of the optical waveguides are then disposed very close to the AOM.

Preferably, it is provided that the optical waveguides abut one another almost directly with their exposed cladding layers.

If the distance of the central axes of the mutually adjacent optical waveguides has, at least to a good approximation, the value $d = f \cdot 2\lambda$ (f=focal length of the lens), the beam axes extend between lens and the optical waveguide parallel to the optical axis of the lens and between lens and AOM inclined by the Bragg angle to the direction of the acoustic wavefront conducted through the AOM.

As a result of the fact that the focal length f of the lens does not substantially exceed the value $w_{max} \pi w_o / \lambda$, it is ensured that the beam widths of the parallel beams passing through the AOM do not exceed the active aperture of the AOM.

In principle, it would be feasible to use a Selfoc lens as the lens. However, at the present time no Selfoc lenses with the focal lengths required for the invention are available. The solution according to the invention could, however, be achieved in an outstanding manner with plano-convex or with biconvex lenses.

A free-base optical arrangement is preferred, which is characterized in that the lens and the optical waveguides are secured relative to one another on a supporting body in such a manner that, in the case of the production of the multi-port element, a mutual adjustment of the distances in three mutually perpendicular coordinate directions x, y and z is possible.

In this case, in order to achieve the smallest possible attenuations, there is the possibility of a precise adjustment which would not be possible with a construction without air paths (e.g. integrated optics).

The expenditure on adjustment is reduced in that the distances are selectively adjustable and fixable in the coordinate directions x, y and z independently of one another, and means are provided, which, in the case of the adjustment in one coordinate direction, guarantee the maintenance of the adjustment position in the other coordinate directions. A setting in one coordinate direction cannot then be displaced in the course of the adjustment procedure for the other coordinate directions.

An advantageously constructive solution consists in that the lens and the optical waveguides are adjustable in different coordinate directions. In this case, the optical waveguides are fixed at one side of the AOM in a common retaining block in such a manner that they are disposed in the plane of the acoustic excitation of the AOM.

In such a retaining block, the optical waveguides are already fixed in the correct parallel distance. Their further adjustment can then take place together with the adjustment of the retaining block.

According to a preferred solution, it is provided that the retaining block of the optical waveguides is adjustable in relation to the baseplate exclusively in the x direction (direction of the acoustic wave), while the lens is adjustable in the coordinate directions y and z, and that the lens is arranged in a receiving block, the base part of which is displaceable along longitudinal abutment surfaces which are situated at an angle to one another and which extend in the z direction (the direction of the optical axis), and that the lens is secured in a mounting part displaceable in relation to the base part in the y direction.

Such a constructional system already permits a very accurate relative initial positioning of the individual components, so that subsequently only a fine adjustment which is as exact as possible is still required.

In particular for a construction as four-port element with four monomode optical waveguide port connections, two respective ones of which are disposed at each side of the AOM in a plane common to all, a construction which is symmetrical on both sides with similar lenses is advantageous, which lenses should as far as possible have precisely the same focal length.

As also in the known case, that the optical waveguide which leads to an optical receiver can also be constructed as a multimode optical waveguide, with which the beam to be received can be struck, with low attenuation, without considerable expenditure on adjustment.

In this case, small tolerance deviations of the angular position and of the coaxial configuration are permissible, so that an individual adjustment is possible without exceptional expenditure.

For the solution according to the invention, the greatest possible accuracy in the position of the optical waveguides in the x-z plane should be aimed at. In the case of their retention in a common retaining block, which exhibits a reference plane parallel to the x-z plane, the optical waveguide axes must exhibit a height position in relation to this reference plane which is as far as possible precisely the same. However, they abut against the retaining block with their outer cladding surface. Unfortunately, it is not guaranteed that the outer cladding surface extends precisely concentrically to the core of the optical waveguide. The disadvantageous effect of such a tolerance-caused centre displacement on the position of the adjacent optical waveguides is avoided in that the optical waveguides situated at one side of the AOM are produced from a single optical waveguide longitudinal section by division and mutual juxtaposition of the pieces in the same angular position of the cross-sections.

Likewise, in the case of a four-port element which is constructed symmetrically on both sides, it is advantageously provided that the optical waveguides situated at both sides of the AOM are produced from a single optical waveguide section, whereby two pairs are formed by a first division and subsequent second division of the first pieces mutually juxtaposed at the same angular position, which points are fixed in a respective retaining block in an identical angular position of the cross-sections.

A preferred solution with a simple possibility of adjustment is characterized in that a retaining block for the optical waveguides situated at one side of the AOM and a receiving block for the lens displaceably abut against a common plane parallel to the x-z plane. In the case of a four-port element symmetrical on both sides, it is correspondingly provided that retaining blocks for the optical waveguides and the receiving blocks for the lenses on both sides of the AOM displaceably abut against a common plane parallel to the y-z plane.

Even when only a three-port element is required, a construction as a symmetrical four-port element is advantageous on account of the simple possibility of adjustment; in this case one optical waveguide remains unused.

In particular in the case of application of a multi-port element according to the invention for a heterodyne OTDR, the incorporation of an optical isolator is expedient, which isolator prevents disturbing back-couplings of scattered light into the laser. Such an isolator is preferably to be disposed between the lens and the AOM in the entrance path of the beam emitted by the laser.

The orientation to be obtained of the optical waveguides in the retaining block is achieved precisely in that the retaining block for the optical waveguides consists of a lower part with V-shaped receiving grooves for the optical waveguides and an affixed upper part, which directly abuts against the optical waveguides and exhibits in relation to the lower part an affixing gap of, in particular, 2 to 4 $\mu$m.

A tilting of upper part and lower part is prevented in that on both sides of the optical waveguides forming the connecting gates similar optical waveguides are provided, with spacing, in similar V-grooves of the lower part to secure a stable parallel abutment of the upper part.

A firm abutment of the optical waveguides at the upper part and lower part is promoted in that recesses are incorporated in the region between the central and the outer V-grooves in the gap surfaces of the upper part and/or of the lower part.

Excess adhesive, which could cause a pressing-up of the upper part, is displaced into the escape cavities formed.

In particular for heterodyne OTDR, the emitting lasers of which must be particularly narrow-band and stable, in spite of the insertion of an optical isolator it can additionally be advantageous to provide further measures for the prevention of reflections, since, as is known, an isolator does not entirely block off the backscattered radiation from reflections. Accordingly, according to a preferred solution, it is provided that the end surfaces of the optical waveguides are ground at an angle to the axis of these optical waveguides, which angle differs slightly, in particular by approximately, $\beta = 6°$, from a right angle, and in that the axes of the optical waveguides are disposed at such an angle, in particular $\gamma = 2.7°$, to the axis of the lens, that the axes of the beams emerging from the end surfaces of the optical waveguides extend parallel to the optical axis of the lens.

A simple possibility of production is given in that the obliquely ground end surfaces of the optical waveguides held in a retaining block extend in a common plane, because then only a single polishing process is required for the processing of both end surfaces of the optical waveguides firmly held already in the retaining block. It has appeared that the fact that both end surfaces of the two optical waveguides can no longer be disposed at the same time in the focal plane of the lens has no noticeably disadvantageous effects, on account of the very small displacement path of the closely adjacent end surfaces of the optical waveguides in comparison with the focal length of the lenses.

BRIEF DESCRIPTION OF THE DRAWINGS

FIG. 1 shows the system arrangement of a four-port element;

FIG. 2 shows the system arrangement of a three-port element in which the end surfaces of the optical waveguides are obliquely ground;

FIG. 3 is a perspective representation, the constructional arrangement of the essential components which are to be adjusted of a multi-port element according to the invention.

FIG. 4 shows the arrangement of the optical waveguides in their retaining block.

DETAILED DESCRIPTION OF THE DRAWINGS

Figures 1, 2, 3, 4:
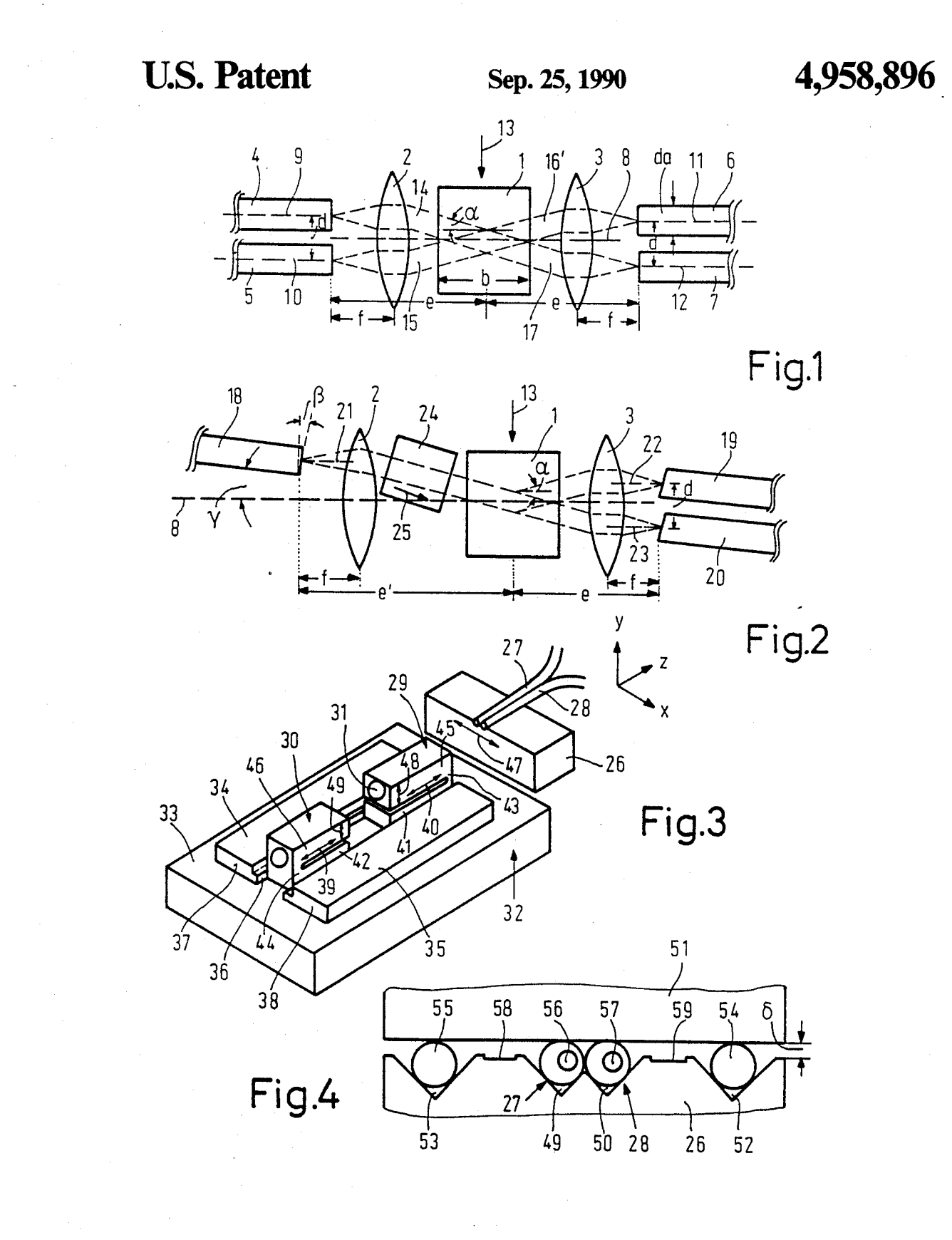

The system, represented diagrammatically in FIG. 1, of a four-port element consists of an AOM 1, similar lenses 2 and 3 having the focal length f, and optical waveguides 4, 5, 6 and 7 forming the port connections. The optical axes of the lenses 2 and 3 and the transmission axis of the AOM 1 coincide with the central line 8. The longitudinal axes 9, 10, 11 and 12 of the optical waveguides 4, 5, 6 and 7 are disposed parallel to one another in a common plane which extends through the central line 8 in the direction 13 of an acoustic wave which can be conducted to the AOM 1. The central line 8 defines the z direction, and the direction of the acoustic wave defines the y direction of an x-y-z coordinate system (cf. also FIG. 3).

The distance 1 from the centre of the AOM to the end surfaces of the optical waveguides 4 to 7 should as far as possible amount to the value $l = 2f + (n-1) b/2n$ (n = refractive index of the AOM material, b = width of the AOM). However, a very precise setting of this value is not necessary, in particular, in circumstances in which the diameter of the active aperture of the AOM 1 is greater than the field width of the parallel, broadened beams 14, 15, 16 and 17, which extend between the lenses 2 and 3 and which intersect in the centre of the AOM 1 and are directed in each instance at the Bragg angle $\alpha$, shown exaggeratedly large, to the central line 8. Such a direction of the beam regions 14 to 17 is obtained when the condition $d = f \cdot 2\alpha$ is at least approximately fulfilled.

Without acoustic excitation of the AOM, a beam emerging from the optical waveguide 4 is conducted into the optical waveguide 7, and a beam emerging from the optical waveguide 5 is conducted into the optical waveguide 6—or inversely in each instance. In the case of excitation of the AOM 1 with an acoustic wave in direction 13, a beam emerging from the optical waveguide 4 is conducted into the optical waveguide 6, and a beam emerging from the optical waveguide 5 is conducted into the optical waveguide 7—or inversely in each instance.

Accordingly, there is a multiplicity of switching paths for the light admitted or received via one of the optical waveguides 4 to 7.

In the case of acoustic excitation of the AOM, at the same time the frequency of the light is altered by the acoustic frequency. This effect can be utilized, in known manner, for the formation of a local oscillator beam (LO) for a heterodyne OTDR.

In the case of an arrangement which was implemented, the following data emerged:

| | |
|---|---|
| Wavelength of the light: | $\lambda = 1,300$ nm |
| Focal length | $f = 4$ mm |
| Acoustic frequency | $fa = 80$ MHz |
| Material of the AOM crystal: | $P_6MoO_4$ |
| Bragg angle | $\gamma = 0.82°$ |
| External diameter of the monomode optical waveguides | $da = 125$ μm |
| Distance of the optical waveguide axes | $d = 127$ μm |
| Width of the AOM | $b = 19$ mm |

In the case of the construction as three-port element according to FIG. 2, the monomode optical waveguides 18, 19 and 20 forming port connections are inclined to the central line 8 in each instance by the angle $\gamma$. As a result of this, it is achieved that, in the case of an oblique grinding of the end surfaces of the optical waveguides 18 to 20 by the angle $\beta$, the axes 21, 22 and 23 of the broadening regions of the beams between the lenses 2 and 3 and the optical waveguides 18 to 20 nevertheless extend parallel to the central line 8. The broadened parallel beams emerging from the lenses to the AOM then pass again, at the Bragg angle, to the AOM 1 and intersect one another at the centre thereof.

In the arrangement according to FIG. 2, as well, the axes of the optical waveguides 18 to 20 lie, in a corresponding manner to FIG. 1, in a common plane. Since the optical isolator 24 is inserted between lens 2 and AOM 1, the distance between the end surface of the optical waveguide 18 and the centre of the AOM is greater than the value e. The end surfaces of the optical waveguides 19 and 20 are disposed at the same distance from the central line 8. For the end surface of the optical waveguide 18 there is on the other hand, on account of the extended path e', an increased distance from the central line 8. However, this is shown greatly exaggerated in FIG. 2. The Bragg angle $\alpha$ is in reality very much smaller. A difference of the relative position of the optical waveguides 18 and 20 can scarcely be detected with the naked eye, so that for the arrangements according to FIGS. 1 and 2 the same adjustment arrangements can be employed as are represented in FIGS. 3 and 4.

It has emerged that the following values for the angles $\beta$ and $\gamma$ are particularly favourable:

$$\beta = 6°$$

$$\gamma = 2.7°$$

If the deviation from these values is no more than approximately 30%, Fresnel reflections are to a large extent avoided, without significant additional insertion losses arising.

In an arrangement which was implemented, the optical waveguides 19 and 20 were secured in a common retaining block, as is represented in FIGS. 3 and 4. In this case, the end surfaces of the optical waveguides 19 and 20 were ground and polished in one working operation, so that these surfaces were disposed in a common plane. Since the angle $\gamma$ is very small, the fact that both end surfaces are then not at the same time disposed precisely in the focal plane of the lens did not lead to significant additional attenuations.

The optical waveguide 18 was disposed with an unused parallel optical waveguide in a same retaining block as the optical waveguides 19 and 20, so that, as in FIG. 1, a symmetrical construction which was constructionally simple and could be adjusted easily was produced.

The arrangement according to FIG. 2 was employed for a heterodyne OTDR. In this case, the laser emission light is supplied through the optical waveguide 18. The isolator 24 was oriented in such a manner that the plane of polarization of the laser light is transmitted almost unhindered in the direction of the arrow 25. On account of the non-reciprocal rotation of the plane of polarization of the light on passing through the isolator 24, virtually no reflected light can pass back to the laser in the opposite direction. An LO beam was taken off via the optical waveguide 19, in the case of acoustic excitation of the AOM 1. Light passing into the optical waveguide 20 when the AOM 1 was not excited was conducted into a monomode optical waveguide to be measured. Since the light experiences only slight attenuations on the paths through the three-port element according to FIG. 2, the range of the heterodyne OTDR equipped with this arrangement was very large, i.e. even the attenuation behaviour of very far distant longitudinal sections of the optical waveguide to be measured could be reliably measured.

The precise adjustment of the individual components relative to one another made a substantial contribution to this successful result. In this case, it was shown that a fine adjustment with target accuracies of fractions of a $\mu$m is possible with simple constructional means and with relatively low expenditure on adjustment, if a constructional arrangement is chosen, the essential features of which are represented in principle in FIGS. 3 and 4.

A particularly important matter is the adjustment of the retaining blocks for the optical waveguides, of which only one is represented in FIG. 3 by its lower part 26 and the optical waveguides 27 and 28 affixed thereto, relative to the receiving blocks 29 and 30 for lenses 31. Between the receiving blocks 29 and 30, an AOM 1 and possibly further required optical components such as an isolator 24 are to be disposed in their correct position in an appropriate manner. For the sake of better clarity, representation of these has been dispensed with in FIG. 3.

The main components of the mounting, permitting an appropriate adjustment, for the components 26, 29 and 30 to be adjusted are a baseplate 32, which exhibits a carefully processed reference abutment surface 33, and guide rails 34 and 35 disposed thereon, with lateral abutment surfaces 36 and, on both sides in each instance, end abutment surfaces 37 and 38 respectively, which extend in each instance at right angles to the lateral abutment surfaces 36.

The reference abutment surface 33 of the baseplate 32 is parallel to the x-z plane, the lateral abutment surfaces 36 are parallel to the y-z plane, and the end abutment surfaces 37 and 38 are parallel to the x-y plane.

The receiving blocks 29 and 30 are displaceable on the reference abutment surface 33 along the lateral abutment surfaces 36 in the direction of the double arrow 39 or 40, that is in the z-direction. The lower part 26 is displaceable on the reference abutment surface 33 along the covered end abutment surfaces 37 and 38 in the direction of the double arrow 47, that is in the x-direction. Mounting parts 45 or 46 for the lenses 31 are articulated at the base parts 41 or 42 of the receiving blocks 29 and 30 via bending points 43 or 44, so that their regions supporting the lenses 31 can be raised and lowered in the direction of the double arrows 48 or 49, that is in the y-direction.

The slight angular tilting of the lenses 31 produced thereby could be tolerated.

It is seen that the necessary relative displacements of the lenses 31 in relation to the end surfaces of the optical waveguides 27 and 28 is possible in each of the coordinate directions x, y and z. A selective adjustment can take place in each individual coordinate direction, without the adjustment position in the other coordinate directions thereby being impaired.

The fixing of the base parts 41 or 42 and of the lower parts 26 can advantageously take place by screwing them to the baseplate 32. The fixing of the final adjustment position of the frame parts 45 or 46 in relation to the base parts 41 or 42 is advantageously effected with an escapement of a grub screw, which serves the adjustment, is rotatable in the thread of one of the components, and presses against the other component.

Particular care is also required in fixing the optical waveguides 27 and 28 in their retaining blocks. They must extend at a precisely parallel spacing from one another in a plane, which is parallel to the lower surface of the lower part 26, which abuts against the reference abutment surface 33. Consequently, V-shaped insertion grooves 49 and 50 according to FIG. 4 are provided in the lower part 26 at such a depth that the inserted optical waveguides 27 and 28 project beyond the surface of the lower part 26 by a small measure of a required optimal affixing gap $\delta$ (approximately 3 $\mu$m, shown exaggeratedly large). During the affixing process, the optical waveguides 27 and 28 are pressed without play into the V-grooves 49 or 50 by the mounted upper part 51. Identically deep edge V-grooves 52 and 53 with inserted optical waveguide parts 54 and 55 are provided in the lower part 26 so that the parallelism of the lower part 26 and upper part 51 is maintained, whereby both optical waveguides 27 and 28 can be pressed in the same way into their grooves 49 or 50.

These edge grooves have a very much larger distance than the V-grooves 49 and 50. Like the optical waveguides 27 and 28, the optical waveguide parts 54 and 55 are sections of a single longitudinal section of an initial optical waveguide, so that in each case an equal external diameter is ensured with adequate precision for all optical waveguide elements of FIG. 4.

The optically active axes of an optical waveguide (cf. positions 9 to 12 in FIG. 1) are, unfortunately, not determined by the central axis of the outer cladding surface of an optical waveguide, but by the central axis of the optically active core. As indicated in FIG. 4, the core surfaces 56 to 57 of the optical waveguides 27 or 28 can, as determined by production, be displaced eccentrically to the external circle of the optical waveguides 27 or 28. Just like optical waveguides possibly requiring to be disposed in a retaining block lying opposite, the optical waveguides 27 and 28 are therefore produced by multiple division from a single longitudinal section of an initial optical waveguide, and inserted into the associated V-grooves 49 and 50 in a cross-sectional angular position identical for all partial lengths. It is achieved in this way that the central points of the core surfaces 56 and 57 are disposed at precisely the distance of the V-grooves 49 or 50 and in a surface parallel to the base surface of the lower part 26, in which, of course, the centre points of the cores of the optical waveguides supported by a retaining block lying opposite must also lie. Further, the lower parts 26 of the retaining block represented in FIG. 3, and of a retaining block lying opposite which is not represented were machined in a cutting manner for the same purpose while being jointly clamped in such a way that its contours pointing towards the gap extend plane-parallel to the base surface. The grinding and the polishing of the end surfaces of the optical waveguides of both retaining blocks were also carried out at the same time, so that it is ensured especially for an arrangement according to FIG. 2, that the bevel angle $\beta$ is the same for all optical waveguides.

To prevent the pressing-up of the upper part 51 by the adhesive, recesses 58 and 59, into which the adhesive can escape, were introduced into the gap surface of the lower part 26.

A precise adjustment is facilitated in that the mutual abutment surfaces at the components to be displaced against one another are manufactured with high precision.

This applies to surface quality, observation of the right angle, and the plane-parallelism of the surfaces. It turned out in this case that an excessively smooth polishing of the surfaces sliding on one another during adjustment leads to an adhesion of these surfaces to one another. Such an adhesion was avoided in that crisscrossing microscopic machining marks were incorporated into the surface.

The illustrative embodiments represented in the figures were chosen with a view to explaining the essential features of the invention. However, the features set forth as essential in the patent claims and explained with reference to the description of the illustrative embodiments can, of course, be combined to form numerous varieties of multi-port elements. In particular, the invention is not restricted to a number of two optical waveguides disposed at one side. Since the Bragg angle is dependent on the acoustic frequency, it would also be possible, by appropriately variable setting of the acoustic frequency, to direct entrance beams onto more port positions than predetermined by only two optical waveguides.

Further, the adjustment principles explained with reference to FIG. 3, can advantageously be applied quite generally for all cases in which two optical components, such as, for example, two lenses, have to be selectively adjusted in several coordinate directions.

For example, the arrangement represented in FIG. 4 can also be used to achieve a precise multiple plug-in connection of a group of optical waveguides disposed in a plane by means of two mutually abutting retaining blocks according to FIG. 4.

What is claimed is:

1. Optical multi-port element with an acousto-optical modulator (AOM), which exhibits at one side at least two optical waveguides having end surfaces disposed in the focal plane of a lens situated between the optical waveguides and the acousto-optical modulator, comprising a single lens disposed at least on one side of the AOM with its optical axis parallel to the transmission axis of the AOM, and in that the optical waveguides are disposed with their axes parallel to one another and spaced from the optical axis of the lens, the distance, d, between the axes of the optical waveguides being chosen so that light beams emanating from said waveguides and impinging said lens are directed by the lens to the active region of the AOM at the Bragg angle, $\alpha$, with respect to said AOM optical axis.

2. The optical multi-port element according to claim 1 wherein the distance between the optical waveguides, d, situated next to one another is smaller than three times the waveguide's external diameter.

3. The optical multi-port element according to claim 1, wherein the optical waveguides are mutually adjacent with their cladding layer exposed.

4. The optical multi-port element according to claim 1 wherein said distance d between said optical waveguides is substantially equal to $f \cdot 2\alpha$, f being the focal length of the lens.

5. The optical multi-port element according to claim 1, wherein the focal length f of the lens does not substantially exceed the value $w_{max} \cdot \pi w_0 / \lambda$, in which $2w_{max}$ is the diameter of the active aperture of the AOM, $w_0$ is the field width of the beam that can be conducted by the optical waveguide in monomode, and, $\lambda$ is the wave length of the light transmitted in monomode by the optical waveguide.

6. The optical multi-port element according to claim 1, wherein the lens is a plano-convex or biconvex lens.

7. The optical multi-port element according to claim 1 wherein the lens and the optical waveguides are secured relative to one another on a supporting body to permit a mutual adjustment of the distances between the lens and waveguides in three mutually perpendicular coordinate directions x, y and z.

8. The optical multi-port element according to claim 7, wherein the distances are selectively adjustable and fixable in the coordinate directions x, y and z independently of one another, and means are provided permitting adjustment in one coordinate direction while maintaining the maintenance of the adjustment position in the other coordinate directions.

9. The optical multi-port element according to claim 7, wherein the lens and the optical waveguides are each adjustable in coordinate directions.

10. The optical multi-port element according to claim 1, wherein the optical waveguides associated with one side of the AOM are fixed in a common retaining block in such a manner in the plane of the acoustic excitation of the AOM.

11. The optical multi-port element according to claim 10, wherein the retaining block of the optical waveguides is adjustable in relation to a baseplate exclusively in the direction of the acoustic wave, and the lens is adjustable in the coordinate directions y and z perpendicular to said direction of said acoustic wave, and the lens is supported in a receiving block the base part of which is displaceable along longitudinal abutment surfaces which are situated at an angle to one another and which extend in the direction of the optical axis z, and the lens is secured in a mounting part displaceable in relation to the base part in the y direction.

12. The optical multi-port element according to claim 1, wherein the optical waveguides forming input or output ports, and situated at both sides of the AOM are disposed in a common plane.

13. The optical multi-port element according to claim 1, wherein two optical waveguides are disposed at both sides of the AOM.

14. The optical multi-port element according to claim 13, wherein at one side of the AOM one of the two optical waveguides is a multimode optical waveguide.

15. The optical multi-port element according to claim 10, wherein the optical waveguides situated at said one side of the AOM are produced from pieces of a single longitudinal optical waveguide section the pieces being located in the same angular position in V-grooves of said retaining block.

16. The optical multi-port element according to claim 13, wherein the optical waveguides at both sides of the AOM are produced from a single optical waveguide section forming two pairs of waveguide sections being mutually juxtaposed at the same angular position, said pairs being fixed in a respective retaining block.

17. The optical multi-port element according to claim 1, further comprising a retaining block for the optical waveguides situated at one side of the AOM and a receiving block for the lens displaceably abut against a common plane.

18. The optical multi-port element according to claim 17, wherein the retaining blocks for the optical waveguides and the receiving blocks for the lenses on both sides of the AOM displaceably abut against a second common plane perpendicular to said first common plane.

19. The multi-port optical element according to claim 1, wherein an optical isolator is disposed in the light path between at least one of the optical waveguides and the AOM.

20. The multi-port element according to claim 19, wherein the optical isolator is disposed in a beam path between the lens and the AOM.

21. The multi-port optical element according to claim 17, wherein the retaining block for the optical waveguides comprises a lower part with two V-shaped receiving grooves for receiving the optical waveguides and an affixed upper part, which directly abuts against the optical waveguides and provides in relation to the lower part an affixing gap of 2 to 4 m.

22. The multi-port optical element according to claim 21, wherein on both sides of the optical waveguides similar optical waveguides are provided, with spacing, in two additional similar V-grooves of the lower part to secured a stable parallel abutment of the upper part.

23. The multi-port optical element according to claim 21, wherein recesses are incorporated in the region between the V-grooves in the surfaces of the upper part or of the lower part.

24. The multi-port optical element according to claim 1, wherein the end surfaces of the optical waveguides are ground at an angle to the waveguide axis, which angle differs slightly by approximately $\beta = 6°$, from a right angle, and in that the axes of the optical waveguides are disposed at such an angle, in particular $\gamma = 2.7°$, to the axis of the lens, that the axes of the beams emerging from the end surfaces of the optical waveguides extend parallel to the optical axis of the lens.

25. The multi-port optical element according to claim 24, wherein the ground end surfaces of the optical waveguides fixed in a retaining block extend in a common plane.

26. The multi-port optical element according to claim 1, wherein the optical waveguides are monomode optical waveguides.

* * * * *